Figure 1:
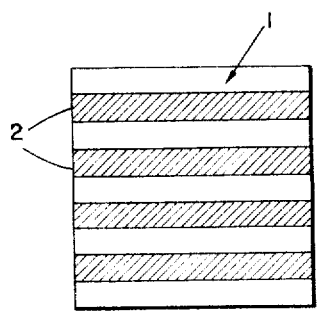

Aug. 23, 1966  T. H. BENZINGER  3,267,727
THERMOPILE AND RADIOMETER INCLUDING SAME
AND METHOD OF PRODUCING THEMOPILE
Filed Nov. 16, 1961  2 Sheets-Sheet 1

INVENTOR.
Theodor H. Benzinger
BY
Attorney

Aug. 23, 1966 T. H. BENZINGER 3,267,727
THERMOPILE AND RADIOMETER INCLUDING SAME
AND METHOD OF PRODUCING THEMOPILE
Filed Nov. 16, 1961 2 Sheets-Sheet 2

INVENTOR.
Theodor H. Benzinger
BY
Attorney

United States Patent Office 3,267,727
Patented August 23, 1966

1

3,267,727
THERMOPILE AND RADIOMETER INCLUDING SAME AND METHOD OF PRODUCING THERMOPILE
Theodor H. Benzinger, 8730 Preston Place, Chevy Chase, Md.
Filed Nov. 16, 1961, Ser. No. 153,269
23 Claims. (Cl. 73—190)

The invention described herein may be manufactured and used by or for the Government of the United States of America for governmental purposes without the payment of any royalties thereon or therefor.

The present invention relates generally to apparatus for and methods of measuring the intensity of thermal radiation and, more particularly, to a thermopile panel construction that can be used in radiometers of the type that measure, for example, the total thermal radiation incident upon an object or a unit area from an unknown $2\pi$ or $4\pi$ radiant environment or the total thermal radiation emitted from or absorbed by an object in a known $2\pi$ or $4\pi$ radiant environment.

The need for quantitatively analyzing the radiant environment of an object or a location is encountered in such diverse technological areas as physics, climatology, medicine, architectural, human and agricultural engineering. In the latter field, for example, the problem may involve ascertaining the total amount of the thermal radiation incident upon a portion of the terrain during a given time interval or under various weather conditions. In architectural engineering, measurements of the $2\pi$ radiation from the walls, windows or ceilings of a structure provide valuable design information. Radiometers can also be employed in medical research to investigate the total radiation absorbed by a human body or an animal in a known $4\pi$ environment, or to measure from a remote position the radiated heat loss or the average surface temperature of a heat-producing means such as radioactive material or a chemical reaction.

In one class of prior art radiometers, these measurements are dependent upon the relative location and angular position of the thermal detecting unit with respect to the object or the environment being viewed. This directivity characteristic makes it extremely difficult, if not impossible, to evaluate the total radiation from a source, such as a human body, which has a nonuniform surface temperature. Besides this shortcoming, some of the prior art instruments contain windows or relatively compact thermal detecting components which give the radiometer a correspondingly small aperture. This limited viewing capability further complicates the measuring procedure.

The accuracy of some of the prior art radiation monitoring devices is further impaired by air motion and air conductivity which have the effect of introducing thermal shunts between parts of the instrument which are sensitive to radiation but at different temperatures. In an attempt to insulate these instruments from air disturbances, barriers and other mechanical means are often positioned in the immediate vicinity of the thermal sensitive detecting elements. However, these shields, to a certain extent, behave as secondary sources of radiation and make it impossible to know with certainty what the radiometer is actually viewing.

It is accordingly an object of the present invention to provide a new and novel thermopile construction which can be readily employed with radiometers of the type which measure radiant energy levels in or from $2\pi$ or $4\pi$ environments.

Another object of the present invention is to provide a new method for fabricating a thermopile panel having a matrix of thermoelectric junctions.

A still further object of the present invention is to provide a geometric array of thermoelectric junctions which can be used in thermal radiation measuring apparatus.

A still further object of the present invention is to provide a radiometer for measuring total radiation from either a $2\pi$ or a $4\pi$ environment wherein the precision of the measurement is independent of the relative location and disposition of the radiometer and the emitter.

A still further object of the present invention is to provide a radiometer for measuring the total heat loss from an object wherein the size, shape, emissivity of the object do not affect the measurement.

A yet still further object of the present invention is to provide a radiometer wherein the effects of air motion and air conductivity are minimized as a result of the construction of the thermopile acting as its detecting apparatus.

A yet still further object of the present invention is to provide a simple and inexpensive method for producing thermopile panels wherein electroplating, stamping and printing procedures are used.

A still further object of the present invention is to provide a thermopile structure wherein the "hot" and "cold" junctions differ only in their emissivity characteristics.

Figure 2:
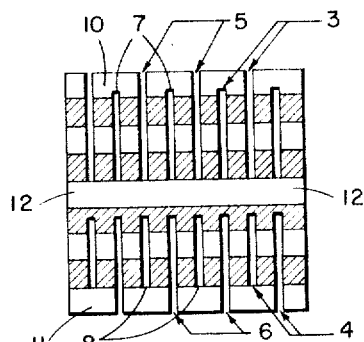
Figure 3:
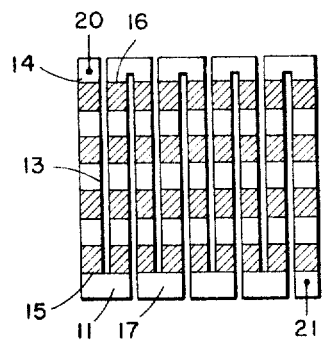
Figures 4, 5:
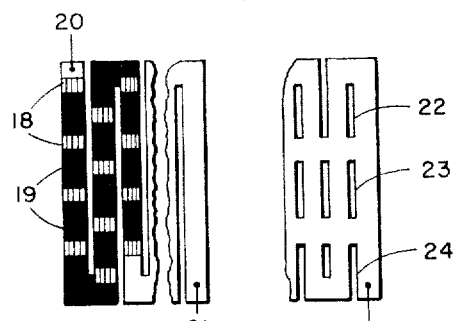
Figure 6:
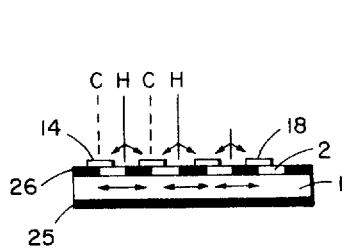
Figure 7:
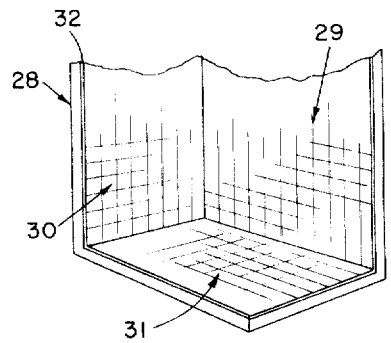
Figures 8, 9:
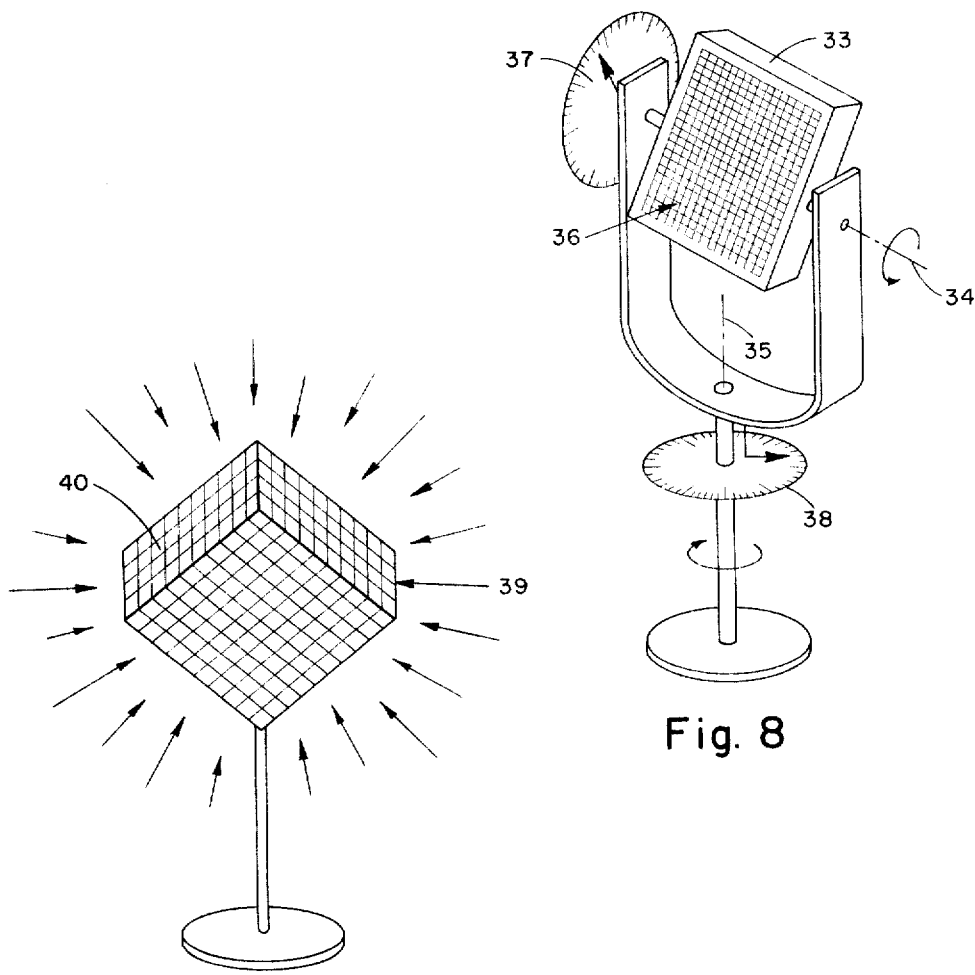

Other objects and many of the attendant advantages of this invention will be readily appreciated as the same becomes better understood by reference to the following detailed description when considered in connection with the accompanying drawings wherein:

FIG. 1 illustrates the first step in fabricating a thermopile panel according to one preferred method;
FIG. 2 illustrates the second operation;
FIG. 3 depicts the appearance of the base member after the second stamping operation;
FIG. 4 shows the final form of a portion of the active face of the thermopile panel;
FIG. 5 shows an alternative stamping operation;
FIG. 6 is a cross-sectional view taken through one column of thermojunctions of FIG. 4;
FIG. 7 illustrates part of a black-body radiometer for measuring total radiation from a heat source;
FIG. 8 shows a simple $2\pi$ receiver; and
FIG. 9 shows a $4\pi$ receiver fabricated with thermopile panels constructed according to one preferred method.

Briefly and in somewhat general terms, the above objects are realized by first fabricating thin, deformable thermopile panels, which contain a mosaic of thermojunctions, by a process which utilizes electroplating, stamping and metal evaporation operations and, thereafter, mounting these panels so that, depending upon the type of measurement being made, they entirely cover a planar surface or the complete inner and outer surfaces of a container or a radiometer structure. In the particular case where, for example, the total energy radiated from a given source is desired, this source is disposed within a closed container of high thermal capacity and conductivity, the temperature of which is precisely set and carefully maintained. The inner walls of this container or "black body" are completely lined with thermopile panels of the above type. Since the emitting source is completely surrounded with thermal sensitive detecting elements, its angular disposition, size, shape and emissivity do not affect the radiometer's measurement. Stated somewhat differently, since the radiometer views every finite area of the heat source, its output will, in effect, be an integration of the radiation coming from all angles and, consequently from all parts of the source.

The stability against air motion of radiometers constructed with thermopiles fashioned in accordance with the present invention results from the presence of internal "thermal shunts" or "thermal short circuits" which bridge adjacent "hot" and "cold" thermojunctions. These shunts are provided by portions of the thermopile panel.

Because practically all of the heat flow from a "hot" junction to a "cold" junction takes place via this metallic path rather than through the surrounding air, movements of this air and variations in its conductivity do not substantially alter the performance of the radiometer.

The successive operations involved in fabricating a thermopile panel, according to one preferred method, are schematically depicted in FIGS. 1 through 4. Referring now to the first of these figures, FIG. 1, a metallic base member 1, which can for illustrative purposes take the form, for example, of a rectangular sheet or panel of constantan of approximately 0.006 inch thick, has electroplated on one surface thereof a multiplicity of equally spaced, horizontal rows 2 of a metal which is thermoelectrically different than that of the base member. This other material may be copper or silver, for example, and its thickness may be in the order of 0.005 inch. After this pattern is applied, an upper and lower series of vertically aligned slots 3 and 4 are stamped out of the plated base member. Preferably, these slots should extend in a direction that is perpendicular to the horizontal rows. And, as viewed in FIG. 2, alternate slots of each series, such as slots 5 of the upper series and slots 6 of the lower series, should terminate at opposite boundary edges of the base member. The remaining slots 7 and 8 of each series should terminate approximately the width of one row short of these edges so as to form with adjacent slots a multiplicity of bridges, such as 10 and 11, for interconnecting adjacent columns of thermojunctions. It makes no difference which slots of each series extend to the boundary edges provided the relationship between adjacent slots just described is maintained throughout each series. The location of the other ends of the slots is not critical, but sufficient base metal 12 should remain between confronting ends of both series of slots to give some degree of structural integrity to the over-all stamping.

After the first stamping operation, a plastic backing, not shown, but in the form of, for example, a sheet of "Mylar" of approximately 0.002 inch thick, is bonded or otherwise applied to the back surface of the base member with an adhesive, such as the composition identified as "3 M adhesive EC 826." By applying the plastic material at this time, sufficient strength is imparted to the cutout panel so that it retains its precise shape. The exact alignment of all of the thermojunctions is thus insured. Next, a second stamping operation is performed which removes those portions of the base member which previously had been left intact between each pair of vertical slots. Thus, as shown in FIG. 3, these slots are transformed into a single extended slot 13 and a chain or ribbon of thermojunctions is opened up.

This thermopile chain can be considered as starting at the upper, left-hand thermojunction 14, extending down to 15, then around the bridge 11, up to 16 and down again to 17, with each junction, of course, occurring where rectangular areas of copper and constantan abut each other. Those skilled in the art will recognize that successive pairs of thermojunctions of the chain develop electrical signals which become additive and that the output voltage of the complete chain is proportional to the average difference in temperature of these opposing junctions.

After the chain of thermojunctions is formed, a very thin plastic sheet, similar to the one previously affixed to the back surface of base member 1, is bonded or otherwise applied to the front or electroplated surface, using the adhesive composition previously identified. This plastic covering not only provides protection and additional mechanical strength for the thermopile panel but, as will be explained hereinafter, its ability to absorb radiant energy transforms alternate junctions of the chain into so-called "black" or "hot" junctions. It would be mentioned at this time that the front and back plastic sheets combine to fill in each extended slot 13 and give the panel a solid construction.

The final step in the process involves the metal evaporation of a material having a low emissivity, such as aluminum, onto the plastic-covered, electroplated face of the panel. This is done with a mask which is so perforated with finite, rectangular apertures that only alternate thermojunctions of the chain receive a thin, reflective coating. These reflective or shiny spots, illustrated in FIG. 4 by rectangular areas 18, transform alternate thermojunctions into shiny or "cold" junctions for reasons well known to those skilled in the art. As alluded to hereinbefore, the adjacent "black" or "hot" thermojunctions are formed merely by the plastic coating itself. The plastic identified hereinbefore has been found to possess satisfactory radiation absorption characteristics in the infrared range and, therefore, it can be used without further treatment to form the "hot" junctions. These junctions are located in the center of each darkened area 19.

It is important that the added metal coatings of the shiny or "cold" junctions have a negligible thermal resistance or, in other words, an almost infinite thermal conductivity. Then, except for the difference in emissivity for radiated heat, the black and the shiny junctions are not different in any other respect. (If their thermal conductivities were different, they would also respond with an electric potential to heat conveyed to them by conduction or convection. The instrument would then not be uniquely and exclusively responsive to thermal radiation.) The high specific thermal conductivity of metals, such as gold, silver or aluminum, and the extremely low thickness of evaporated films permit these requirements to be satisfied.

The size of each reflecting area 18 is not critical and depends mainly upon the intended application of the thermopile panels. Where, for example, the total radiation from an object is being measured, the inner surfaces of the structure housing this object should be as "black" as possible to minimize radiation back upon the object. Consequently, in this particular case, the reflecting areas should be relatively small. However, it would be noted that the energy reflected from the shiny spots is ultimately absorbed, mainly on the black spots, by infinitely repeated reflection and partial absorption.

In the method set forth hereinabove, only two spaced vertical slots were formed in the first stamping operation. However, if the panel is relatively large, then, as shown in FIG. 5, three or more spaced slots, such as 22, 23 and 24, can be cut out initially to distribute the mechanical support more evenly over the complete panel area. Of course, the second stamping operation would unite all of these slots into a single, extended slot in the metal sheet, though not in the plastic backing.

It will also be noted that in the above method two separate and distinct stamping operations were performed in order to cut out the thermopile chain. If this were done in a single stamping, then the cutout panel would not possess sufficient rigidity or stability to guarantee perfect registry between each thermojunction and each aperture of the mask used in the metal evaporation process. In other words, the cutout panel, because of its thinness, would have a tendency to unravel or otherwise lose its precise shape; and this distortion is prevented by applying the plastic backing after the first intermediate stamping operation. Bridges of plastic will thus be left between the columns in the second stamping operation while the metal bridges are removed. These plastic bridges fulfill indefinitely the function which the metal bridges between columns had temporarily during the time between the first and the second stamping operations. It will be appreciated that for most applications the base member must be relatively thin in order to permit the thermopile panel to be applied to curved or irregular surfaces.

As regards the formation of the "cold" junctions in the above process, it will be apparent that the reflecting material may be painted, printed or applied in any other equivalent manner to the plastic coating. If desired, thin metallic films evaporated on the plastic can be employed to serve as the coverings. Furthermore, the specific frequency response of the thermopile panel can be modified by altering the composition of this plastic material. Any dielectric material can be used and here, again, this sheet can have its surface treated by any well known technique to enhance its selectivity or energy absorption capability.

The final appearance of a portion of the thermopile panel is depicted in FIG. 4. Those skilled in the art will appreciate the fact that the voltage developed between output terminals 20 and 21 will be proportional to the average difference in temperatures of the so-called "hot" and "cold" junctions. In the absence of any illuminating radiation, of course, the chain produces no output voltage since all of the junctions are at the same temperature. For the proper operation of the panel, the substances covering the respective junctions need not exhibit complete energy absorption or complete energy reflection. Any stable, uniform, unchangeable difference in the emissivities of these coatings will do. It will, therefore, be appreciated that the "hot" and "cold" junctions of the thermopanel differ from each other merely in the emissivity characteristics of the coatings covering them.

If the individual "hot" and "cold" thermojunctions of a particular thermopile were insulated from each other and suspended in air with an infinitely fine wire serving as the only means interconnecting them, then practically all of the heat transfer between junctions would take place through the surrounding air. By so thermally isolating the different junctions, the sensitivity of the thermopile would be at a maximum. However, its stability would depend upon air motion and variations in air conductivity. Prior art devices which attempt to utilize this approach to restrict the heat flow between junctions so as to enhance the sensitivity of the radiometer usually incorporates some sort of a shielding device to shelter the thermal-sensitive elements against these air disturbances. However, variations in the thermal conductivity of the air still influence the measurements. Moreover, these shields can behave as secondary heat sources which distract the detecting element and cause the radiometer to see objects other than those which are presumably under examination.

The provision in the present invention which substantially eliminates errors caused by air motion and changes in air conductivity is illustrated in FIG. 6 which is an exaggerated cross section taken through one column of the thermopile panel. The back and front plastic sheets or coatings mentioned previously are here represented by the solid areas 25 and 26. The various "hot" and "cold" junctions are, for simplicity's sake, delineated by the vertical dotted and solid lines marked with letters "H" and "C," respectively. From an inspection of this figure, it will be readily seen that the heat energy present at each "hot" junction because of the behavior of the absorbing plastic coating 2 can be transported to the "cold" junctions either externally by the surrounding air, as shown by the angularly related arrows, or along the surface of the thermopile chain, or internally through the base material, as shown by the horizontal arrows. However, since the thermal conductivity of the metallic base member far exceeds that of the air path, practically all of the heat flow takes place internally and along the thermopile chain. The base member, hence, behaves as a "heat shunt" and reduces to a negligible amount the flow through the air path. By thus restricting the heat flowing through the external path, physical changes in this path, such as those due to air motion or variations in air conductivity, do not significantly disturb the performance of the thermopile panel of any instrument employing it as a radiant energy sensing element. Since there is now no need to shield these panels against air disturbances, the sensing elements are not distracted from viewing solely the object or surface under examination. This will have the effect of stabilizing the zero reading of the radiometer, a requirement that is necessary where the output is being continuously recorded.

The sensitivity of the thermopile panel and, for that matter, any apparatus employing it as a sensing or energy conversion device, is dependent in part on the rate at which radiant energy is absorbed into the "hot" junctions and the rate at which this energy is lost by thermal conduction into the "cold" junctions. When the latter rate is high, the difference between the temperatures of these junctions decreases rapidly and the thermopile's output level diminishes proportionally. Because the heat shunting action referred to above adversely affects the sensitivity of the radiometer, a compromise must be made between realizing maximum sensitivity and maximum air stability. Fortunately, the thermopile panel contains a multiplicity of thermopile junctions which combine to make available sufficient signal strength to permit satisfactory air stability to be achieved without destroying the instrument's response.

By utilizing thermopile panels constructed according to the present invention, a "black body" radiometer can be constructed entirely enclosing a radiant energy emitter. Provided that the construction of the receiver is uniform with respect to size and thermal characteristics of the individual black or shining junctions, provided that the number of junctions is large enough to make the panel almost uniformly sensitive to radiation from a reasonable distance, and provided that whatever differences may exist in characteristics of individual junctions are randomly distributed so that they would cancel out statistically, the following factors do not enter itno the measurements made with such a "black body" receiver: The size of the radiometer is not significant because the density of the radiant flux at each surface thereof will increase or decrease in reverse proportion to the size of the surface or the number of sensitive elements covering it. The shape of the radiometer defined by the angular inclination of different parts of its surfaces does not matter as far as the measurement of the radiometer is concerned because the product of a surface area and the density of the radiant flux received thereon remains constant when this surface is turned, for example, from the perpendicular to an oblique position, with respect to the direction of radiation. Moreover, the geometric size of the source of radiant energy is not significant because the receiving area intersects a solid angle of $4\pi$ radians at any mean distance from the emitting surface of the energy source. Likewise, the shape of the source does not affect the measurements, because Lambert's cosine law applies to the source as well as to the receiver. Because the closed surface of the "black body" receiver will correctly integrate the radiation coming from all angles, the distribution of temperature and emissivity at the surface of the radiant source is also of no importance. And, finally, the location of the emitter within the radiometer is immaterial because it has no influence upon the average density or mean angle of incidence of radiant flux exchanged between the emitter and the receiver.

For the enumerated reasons, a "black body" radiometer which entirely encloses an emitting source will give measurements which are practically independent of the relative location of the emitter and receiver as well as their angular positions in space.

FIG. 7 shows a portion of a "black body" receiver formed by covering the inner surfaces of a cubical container 28 with thermopile panels 29, 30 and 31 fabricated in accordance with the process above described. For proper performance the container should be kept at a known and constant temperature and should possess a high thermal capacity. Also, it should be made of a material that has a high thermal conductivity so that each wall thereof can perform as a heat sink to maintain the temperature of the "cold" junctions of each panel constant and uniform during the heat measurement. There will be a tendency for the inner surfaces of these walls to act as additional thermal shunts, augmenting the behavior of the base members. However, the extent to which this takes place can be controlled by inserting insulating sheets, such as 32, of various thicknesses between the back of each thermopile panel and a confronting wall surface of the container. Since there is little air disturbance within the closed container, insulation 32 can, in this particular case, completely isolate the thermopile panel from the inner walls of the container.

The thermal radiation received and measured by a radiometer such as the one just described from a source enclosed therein can be written:

$$(1) \quad \Phi = A \cdot \sigma \cdot \epsilon \cdot (T^4 - T_e^4)$$

according to the Stefan Boltzmann law, where $\Phi$=radiant flux (cal./sec.); $A$=radiant surface of the source of radiation (cm.$^2$); $\epsilon$=mean emissivity of the source of radiation (percent of black body emissivity); $T_e$=temperature of receiving surface (° abs.); $\sigma$=Stefan Boltzmann constant, $1.373 \times 10^{-12}$(cal./(sec. cm.$^2$ deg.$^4$)); $T$= average surface temperature of the source of radiation (° abs.). Hence, when $\Phi$ is measured, and $A$, $\epsilon$ and $T_e$ are kept constant, changes of $T$ can be observed and recorded in correct proportion. They can be measured in absolute terms, when $A$, $\epsilon$, and $T_e$ are known. On the other hand, changes of the radiant surface can be observed in correct proportion as long as $T$ is constant, or measured, when $T$ is known. The black body radiometer may, therefore, be applied to observations of (a) rate of radiant heat loss; (b) average surface temperature of bodies of determined surface area and emissivity; (c) radiant surface area of bodies of known surface temperature; and (d) emissivity of bodies when area and temperature of the surface are known.

Each thermopile panel, it will be appreciated, may be thought of as a surface radiometer because of its planar construction. Hence, in the case where it is desired to measure the radiation incident on a surface from a $2\pi$ environment, the panel need only be secured to a planar metallic member, such as 33 of FIG. 8, mounted to rotate about two mutually perpendicular axes 34 and 35. Here, again member 33 performs as a heat sink for the purposes and reasons set forth hereinbefore, and its heat shunting ability may be controlled by interposing varying thicknesses of insulation between its surface and the backside of the thermal panel secured thereto. Radiometers of the $2\pi$ type just described may be employed to evaluate in a quantitative manner a nonuniform radiant environment, such as, for example, a classroom with a warm floor, cold windows and a medium warm ceiling. All that is necessary is that the surface detector 36 in FIG. 8 be rotated manually or automatically about the above-mentioned axes and that measurements be taken continuously or at regular intervals of angle. Suitable scales, such as those schematically depicted at 37 and 38, would, of course, be included in the apparatus to give the spatial orientation of the detector at each measuring point.

A "black body" radiometer lined with thermopile panels of the present invention may be used to calculate the emissivity of coatings, various radiation constants in physics or to evaluate sources of heat, light, or other kinds of radiated energy. The measurement of a total $4\pi$ radiant surrounding, of course, requires an inversion of the "black body" receiver described above. That is, the closed surfaces of the body would be maintained at a uniform temperature and the outer surfaces thereof would be completely covered with thermopile panels. The general appearance of such a $4\pi$ receiver is shown in FIG. 9. In this configuration each face of a cube 39 is covered completely with a thermopile panel 40. Since this instrument gives the same reading in every position, there is no need to rotate the apparatus during the measurement operation.

For calibration of a $4\pi$ instrument in terms of unit voltage output per unit radiated energy (cal./sec.), it is only required to place a body of known surface area and known surface temperature (for example a blackened sphere of aluminum) inside the radiometer which is maintained at a known and constant temperature $T_e$ while the temperature of the sphere $T$ may be varied to increase or decrease the intensity of radiation recorded. Linear response in voltage to total radiation emitted from the sphere in calories per unit time is thus readily found. The intensity of radiant flux $\Phi$ is, of course, determined by application of the Stefan Boltzmann equation.

Calibration of a$2\pi$ instrument in terms of voltage output per unit temperature difference between the panel surface and the $2\pi$ environment is found by letting the panel face a $2\pi$ intersecting surface, for example, a heavy metal plate, of known and uniform temperature that can be varied at will. This calibration is slightly nonlinear because the temperatures $T_e$ and $T$ appear in the Stefan Boltzmann equation as fourth power terms.

It will be appreciated that the fabricating method described herinbefore can be modified somewhat with the plastic backing bonded to the front rather than back surface of the base member after the first stamping operation. This plastic covering would, of course, not only provide the additional mechanical strength needed for the slotted member but would also serve to form the alternate "hot junctions." In some applications, the plastic sheet on the back surface can be eliminated. Such would be the case, for example, where the thermopile panel is to be used with a supporting member which has electrical insulation properties.

It would also be mentioned that, while the elongated slots which open up the columns of thermojunctions in the illustrated example are formed by stamping out two complementary patterns of vertical slots, in the fabrication of large thermoelectric panels, three or more stamping operations may be employed to produce the same results. If more than two stamping operations are required, then the first plastic sheet would be applied either to the front or back surface of the base member after the first or second operation, depending upon that point in the fabrication process where additional support should be imparted to the slotted plate to insure the continued alignment of the numerous thermojunctions.

Obviously many modifications and variations of the present invention are possible in the light of the above teachings. It is therefore to be understood that within the scope of the appended claims the invention may be practiced otherwise than as specifically described.

What is claimed is:

1. In a method for producing a chain of thermojunctions from a thin, metallic sheet made of a first material, the steps of applying spaced rows of a second material which is thermoelectrically different from said first material to one side of said sheet, forming in said sheet a first pattern of slots, applying a layer of dielectric material to said one side of said sheet, forming a second pattern of slots in said sheet, the individual slots of said first and second patterns cooperating to form a series of elongated slots which subdivide said sheet into a multiplicity of columns with adjacent pairs of columns being bridged only at either corresponding upper or lower ends thereof whereby a chain of thermojunctions is formed.

2. In a method as defined in claim 1, the additional steps of thereafter covering an opposite side of said sheet with a layer of dielectric material and superimposing reflecting material over alternate thermojunctions of said chain.

3. In a method for producing thermopile chains from a thin, metallic sheet made of a first material, the steps of applying spaced, horizontal rows of a second material which is thermoelectrically different from said first material to one side of said sheet, whereby rows of said first and second material alternate over said one side of said sheet, cutting out of said sheet a first pattern of vertical slots, applying a layer of dielectric material to said one side of said sheet whereby portions of said dielectric material cover the slots of said first pattern to impart structural integrity to said slotted sheet, cutting out a second pattern of vertical slots, the individual slots of said first and second slots cooperating to form a series of elongated vertical slots which subdivide said sheet into a series of columns with adjacent pairs of columns being connected only at either corresponding upper or lower ends thereof whereby a thermopile chain is formed with each thermojunction occurring at the common boundary edges between rows of said first material and rows of said second material.

4. In a method as defined in claim 3, the additional steps of applying a thin layer of dielectric material to an opposite side of said sheet after said first and second patterns of slots have been cut out therefrom, covering alternate thermojunctions of said chain with a reflecting substance whereby said alternate thermojunctions perform as cold junctions when irradiated.

5. In a method for producing thermopile panels from a thin base plate made of a first metallic substance, the steps of forming on one surface of said base plate a series of spaced, parallelly disposed bands of a second metallic substance, said metallic substance being thermoelectrically different from said first metallic substance whereby thermojunctions occur at the boundary edges between each band of said second metallic substance and an adjacent surface portion of said base plate, forming in two or more separate stamping operations a series of vertical slots in said base plate with the odd slots thereof extending from one edge of said base plate to a point adjacent an opposite edge of said base plate and said even slots extending from said opposite edge to a point adjacent said one edge, whereby columns of thermojunctions are formed with adjacent columns being bridged only across either corresponding top or bottom ends thereof, applying a thin sheet of dielectric material over one surface of said plate after said first stamping operation and applying a thin sheet of dielectric material over an opposite surface of said plate after the last stamping operation and thereafter covering every other thermojunction with a spot of reflecting material.

6. In a method of producing thermopile panel from a thin, metallic sheet, the steps of applying to one side of said sheet parallelly spaced, horizontal rows of a metallic material which is thermoelectrically different from the material forming said sheet whereby thermojunctions are formed at the boundary edges of said rows, forming a first pattern of vertical slots in said sheet, securing a thin sheet of dielectric material to one side of said sheet forming a second pattern of vertical slots in said sheet such that the individual slots of said first and second patterns cooperate to form a series of elongated, vertical slots which subdivide said sheet into columns of thermojunctions with adjacent pairs of columns being bridged alternately at only corresponding top or bottom ends thereof and whereby a chain of thermojunctions is produced with the various thermojunctions being maintained in registry by said sheet of dielectric material.

7. In a method as defined in claim 6, the additional steps of applying a thin, dielectric sheet to an opposite face of said sheet and covering every other thermojunction in the chain of thermojunctions with a spot of reflecting material whereby said covered thermojunctions act as so-called "cold junctions" when exposed to thermal radiation.

8. In a method as defined in claim 6, wherein the dielectric sheet applied to the face of said sheet that has the rows of metallic material applied thereto possesses thermal radiation absorption characteristics.

9. In a method for producing thermopile panels from a thin, metallic sheet made of a first material, the steps of applying rows of a second material which is thermoelectrically different from said first material to one side of said sheet, cutting out of said sheet a first pattern of slots, applying a layer of dielectric material to said one side of said slotted sheet whereby portions of said dielectric material cover slots of said first pattern to impart structural strength to said slotted sheet, cutting out a second pattern of slots, the individual slots of said first and second patterns combining to form a series of elongated slots which subdivide said sheet into a series of columns with only one end of a first column being connected to a corresponding end of an adjacent column and the other end of said adjacent column being connected only to a corresponding end of the next column and the other end of said next column being connected only to the corresponding end of the following column, and so on, whereby a chain of thermojunctions is formed with each thermojunction occurring at the upper and lower edges of each row.

10. In a method as defined in claim 9, the additional step of superimposing on said layer of dielectric material finite spots of reflecting material so as to cover alternate thermojunctions of said chain to transform said alternate thermojunctions into so-called "cold junctions."

11. In a method as defined in claim 9, the additional step of applying a thin sheet of dielectric material to the opposite side of said sheet to provide electrical insulation for said chain of thermojunctions.

12. A thermopile panel comprising, in combination, a base plate made of a first metallic substance, a series of spaced parallelly disposed bands of a second metallic substance applied to one surface of said base plate, said second metallic substance being thermoelectrically different from said first metallic substance whereby thermojunctions occur at the boundary edges of each band of said second metallic substance, said base plate having a series of vertical slots cut therein with the odd slots thereof extending from one edge of said base plate to a point adjacent an opposite edge of said base plate and said even slots extending from said opposite edge to a point adjacent said one edge, whereby columns of thermojunctions are formed with adjacent pairs of columns being bridged only across either corresponding top or bottom ends thereof, a sheet of dielectric material covering said one surface of said plate, and spots of reflecting material superimposed on said dielectric material and covering every other thermojunction.

13. In a thermopile panel as defined in claim 12, a sheet of dielectric material applied to an opposite surface of said base plate.

14. A chain of thermojunctions comprising, in combination, a metallic sheet made of a first material, spaced rows of a second material which is thermoelectrically different from said first material applied to one side of said sheet whereby thermojunctions are formed at the boundary edges of each row, said sheet having a series of elongated slots formed therein which subdivide said sheet into a multiplicity of columns, with adjacent pairs of columns being bridged only at either corresponding upper or lower ends thereof, a layer of dielectric material applied to said one side of said sheet, and finite spots of a reflecting material superimposed on said dielectric material at every other thermojunction.

15. A thermopile panel construction comprising, in combination, a thin, metallic sheet made of a first material, a multiplicity of rows of a second material which is thermoelectrically different from said first material applied to one side of said sheet, said sheet having a series of slots formed therein which subdivide said sheet into a series of columns with only one end of a first column being connected to a corresponding end of an adjacent column and the other end of said adjacent column being connected only to a corresponding end of the next column and the other end of said next column being connected only to a corresponding end of the following column, and so on, whereby a chain of thermojunctions is formed, with each thermojunction occurring at the upper and lower edges of each row.

16. In a thermopile panel construction as defined in claim 15, a thin layer of dielectric material secured to said one side of said sheet and finite spots of reflecting material superimposed on said dielectric material so as to cover alternate thermojunctions of said chain.

17. A radiometer comprising, in combination, a metallic sheet made of a first material, spaced rows of a second material which is thermoelectrically different from said first material contacting one side of said sheet thereby to form thermojunctions at opposite boundary edges of each row, said sheet having a multiplicity of slots cut therein which divide said sheet into columns of thermojunctions with adjacent pairs of columns being bridged only at either corresponding upper and lower ends thereof, a layer of dielectric material applied to one side of said sheet, said dielectric material being absorptive of the thermal energy which is to be measured by said radiometer, means superimposed on said dielectric material to reflect thermal energy impinging upon alternate thermal junctions, a layer of dielectric material applied to an opposite side of said sheet, a metallic base member, said opposite side of said sheet being secured to said base member, means for rotating said base member about two mutually perpendicular axes and means for indicating the magnitude of the voltage developed by said columns of thermojunctions.

18. A radiometer comprising, in combination, a metallic sheet made of a first material, spaced rows of a second material which is thermoelectrically different from said first material applied to one side of said sheet whereby thermojunctions are formed at the opposite boundary edges of each row, said sheet having a series of elongated slots formed therein which subdivide said sheet into a multiplicity of columns of thermojunctions with adjacent pairs of columns being bridged only at either corresponding upper or lower ends thereof, a layer of dielectric material applied to said one side of said sheet, finite spots of reflecting material applied to said dielectric material so as to cover only alternate thermojunctions, and means for mounting said sheet for rotation about two mutually perpendicular axes.

19. A radiometer comprising, in combination, a multiplicity of thermopile panels, each of said panels comprising a metallic plate made of a first material, spaced rows of a second material which is thermoelectrically different from said first material applied to one side of said plate whereby thermojunctions are formed at the opposite boundary edges of each row, said plate having a series of slots formed therein which subdivide said plate into columns of thermojunctions with adjacent pairs of columns being bridged only at either corresponding upper or lower ends thereof, a layer of dielectric material applied to said one side of said plate, finite spots of a thermally reflecting material superimposed on said dielectric material so as to cover only alternate thermojunctions of said columns, a layer of dielectric material applied to the opposite side of said plate, a cubical member, means for covering each face of said cube with a thermopile panel with said opposite side of each sheet confronting a surface of said cubical member and means for indicating the magnitude of the output voltages developed by said thermopile panels to thereby give an indication of the total amount of radiation illuminating said cubical member.

20. A radiometer comprising, in combination, a multiplicity of thermopile panels, each of said panels comprising a base member made of a first metallic material, spaced rows of a second metallic material which is thermoelectrically different from said first metallic material applied to one side of said base member whereby thermojunctions are formed at the opposite boundary edges of each row, said base member having a series of slots formed therein which subdivide said base member into columns of thermojunctions with adjacent pairs of columns being bridged only at either corresponding upper or lower ends thereof, a dielectric layer applied to said one side of said base member, finite spots of a thermally reflecting material superimposed on selected portions of said dielectric material so as to cover only alternate thermojunctions of said columns, a dielectric layer applied to the opposite side of said base member, an enclosed container, the inner wall surface of said container being completely covered with said thermopile panels, and means for indicating the total sum of the output voltages developed by said thermopile panels to give an indication of the total amount of radiation emitted from a source disposed within said enclosed container.

21. In an arrangement as defined in claim 20 wherein said enclosed container is made of a material having a high thermal conductivity.

22. A radiometer comprising, in combination, a multiplicity of thermopile panels, each of said panels comprising a base member made of a first metallic material, spaced rows of a second metallic material which is thermoelectrically different from said first metallic material applied to one side of said base member whereby thermojunctions are formed at the opposite boundary edges of each row, said base member having a series of slots formed therein which subdivide said base member into columns of thermojunctions with adjacent pairs of columns being bridged only at either corresponding upper or lower ends thereof, a dielectric layer applied to said one side of said base member, finite spots of a thermally reflecting material superimposed on selected portions of said dielectric material so as to cover only alternate thermojunctions of said columns, a dielectric layer applied to the opposite side of said base member, an enclosed box, means for covering each inner wall surface of said box with a thermopile panel with the opposite side of each base member confronting a corresponding wall surface of said box, means for connecting said thermopile panels in a series circuit with the voltages developed by said panels in an additive relationship, and means for indicating the magnitude of the output voltage of said series circuit thereby to provide an indication of the total amount of radiation emanating from a source disposed within said hollow box.

23. In an arrangement as defined in claim 22, wherein the said hollow box is made of a material having a high thermal conductivity and wherein the thickness of the walls of said box is sufficient to give said box a high thermal capacity.

References Cited by the Examiner
UNITED STATES PATENTS

| 2,106,768 | 2/1938 | Southworth. | |
|---|---|---|---|
| 3,018,311 | 1/1962 | Bagno et al. | 136—4 |

OTHER REFERENCES

Gier et al.: American Institute of Physics, 1941, pages 1284–1288.

WINSTON A. DOUGLAS, *Primary Examiner.*

JOHN H. MACK, *Examiner.*

J. BARNEY, A. M. BEKELMAN, *Assistant Examiners.*